US006685205B1

(12) United States Patent
Weaver et al.

(10) Patent No.: US 6,685,205 B1
(45) Date of Patent: Feb. 3, 2004

(54) MULTI-SPEED INLINE BICYCLE TRANSMISSION

(76) Inventors: Blaze L. Weaver, P.O. Box 434745, San Diego, CA (US) 92143-4745; Blaze R. R. Weaver, P.O. Box 434745, San Diego, CA (US) 92143-4745; Blair Sutton, P.O. Box 418, Ottawa, KS (US) 66067

( * ) Notice: Subject to any disclaimer, the term of this patent is extended or adjusted under 35 U.S.C. 154(b) by 0 days.

(21) Appl. No.: 10/267,388

(22) Filed: Oct. 9, 2002

(51) Int. Cl.[7] .................................... B62M 1/02
(52) U.S. Cl. .................................... 280/260
(58) Field of Search .................... 280/260, 259, 280/257, 249, 236, 238; 74/423, 424, 594.2

(56) References Cited

U.S. PATENT DOCUMENTS

| | | | | | |
|---|---|---|---|---|---|
| 572,208 | A | * | 12/1896 | Lorenz | 280/260 |
| 821,340 | A | * | 5/1906 | Copeland | 280/260 |
| 2,561,960 | A | | 7/1951 | Weaver | |
| 3,861,715 | A | * | 1/1975 | Mendoza | 280/260 |
| 3,863,503 | A | | 2/1975 | Loeb et al. | |
| 4,005,611 | A | | 2/1977 | Jeffries | |
| 4,447,068 | A | | 5/1984 | Brooks | |
| 5,078,416 | A | * | 1/1992 | Keyes | 280/260 |
| 5,228,354 | A | | 7/1993 | Oosterwal et al. | |
| 5,316,327 | A | * | 5/1994 | Bell | 280/260 |
| 5,482,306 | A | * | 1/1996 | Hsu | 280/260 |
| 5,622,081 | A | * | 4/1997 | Clements | 74/351 |
| 5,852,948 | A | * | 12/1998 | Chang | 74/417 |
| 5,967,537 | A | * | 10/1999 | Chang | 280/259 |
| 6,112,609 | A | | 9/2000 | Brown | |
| 6,155,127 | A | | 12/2000 | Pogson | |
| 6,478,323 | B2 | * | 11/2002 | Chang | 280/260 |

* cited by examiner

*Primary Examiner*—Avraham Lerner
(74) *Attorney, Agent, or Firm*—Dale J. Ream

(57) ABSTRACT

A bicycle transmission includes a drive shaft having collinear input and output portions, an upstream end of the input portion being connected to the bicycle crank axle with a pair of bevel gears for transmitting rotational force therebetween. An epicyclic gear train is mounted intermediate the input and output portions. The gear train includes carrier plates coupled to the input and output portions with bearings and connected to one another by a carrier axle. A sun gear is fixedly attached to the output portion and engages a planet gear set rotatably mounted to the carrier axle. Ring gears are positioned to mesh with corresponding planet gears. A selected ring gear may be halted to establish a desired transmission ratio by which rotational force is transmitted between input and output portions. The output portion is connected to the rear wheel axle with a pair of bevel gears.

14 Claims, 5 Drawing Sheets

10
16
18
22
12
20
36

MULTI-SPEED INLINE BICYCLE TRANSMISSION

BACKGROUND OF THE INVENTION

This invention relates generally to shaft driven bicycles and, more particularly, to a multi-speed inline bicycle transmission having simple and compact gearing for improved torque transfer and durability.

Typical multi-speed bicycles utilize a derailleur gear chain assembly which includes multiple sprockets of different diameters onto which a bicycle chain is selectively routed in order to change transmission ratios. Chain driven transmissions, however, include several disadvantages, such as a chain slipping off a sprocket, tensioner mechanism malfunction, clothing becoming entangled in the chain, dirt or debris build-up in chain linkages, etc.

Various chainless transmissions for bicycles have been proposed in the art for overcoming the above-mentioned disadvantages. Although assumably effective for their intended purposes, the existing chainless transmissions utilize friction roller designs that are not durable and allow power losses greater than any gains in efficiency or require multiple moving parts for changing gear ratios.

Therefore, it would be desirable to have an inline bicycle transmission for selectively modifying the transmission ratio of a drive shaft rotational force mounted inline relative to a drive shaft and which efficiently transfers that force to a bicycle rear wheel. Further, it would be desirable to have an inline bicycle transmission which selectively transmits torque between input and output drive shaft portions using highly efficient and durable straight cut gears and without power losses associated with transmitting power between angled shafts.

SUMMARY OF THE INVENTION

A multi-speed inline bicycle transmission according to the present invention includes a drive shaft having input and output portions. An upstream end of the input portion is connected to the crank axle of a bicycle crank-and-pedal assembly with a pair of bevel gears for efficiently transmitting a rotational force from the crank axle to the drive shaft input portion. An epicyclic gear train encased in a gear box is mounted inline to the drive shaft intermediate drive shaft input and output portions. The epicyclic gear train includes a plurality of compact, straight cut gears for establishing predetermined transmission ratios. Thus, a rotational force of the drive shaft input portion may be transmitted to the drive shaft output portion in an inline configuration without the inefficiencies or power loss experienced by more complex gear configurations or constructions. Further, the epicyclic gear train may provide multiple gear ratio selections without significantly increasing the size or complexity of the gear train. The epicyclic gear train is connected to the output portion where the output rotational force is efficiently transmitted to the bicycle rear wheel axle through another pair of bevel gears.

Therefore, a general object of this invention is to provide a multi-speed inline shaft-driven transmission for a bicycle that is compact, durable, and efficient.

Another object of this invention is to provide a bicycle transmission, as aforesaid, which utilizes two sets of bevel gears for efficiently transferring power between angled shafts.

Still another object of this invention is to provide a bicycle transmission, as aforesaid, which provides multiple gear ratios without using any clutches.

Yet another object of this invention is to provide a bicycle transmission, as aforesaid, which utilizes straight cut gears to provide variable transmission ratios.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
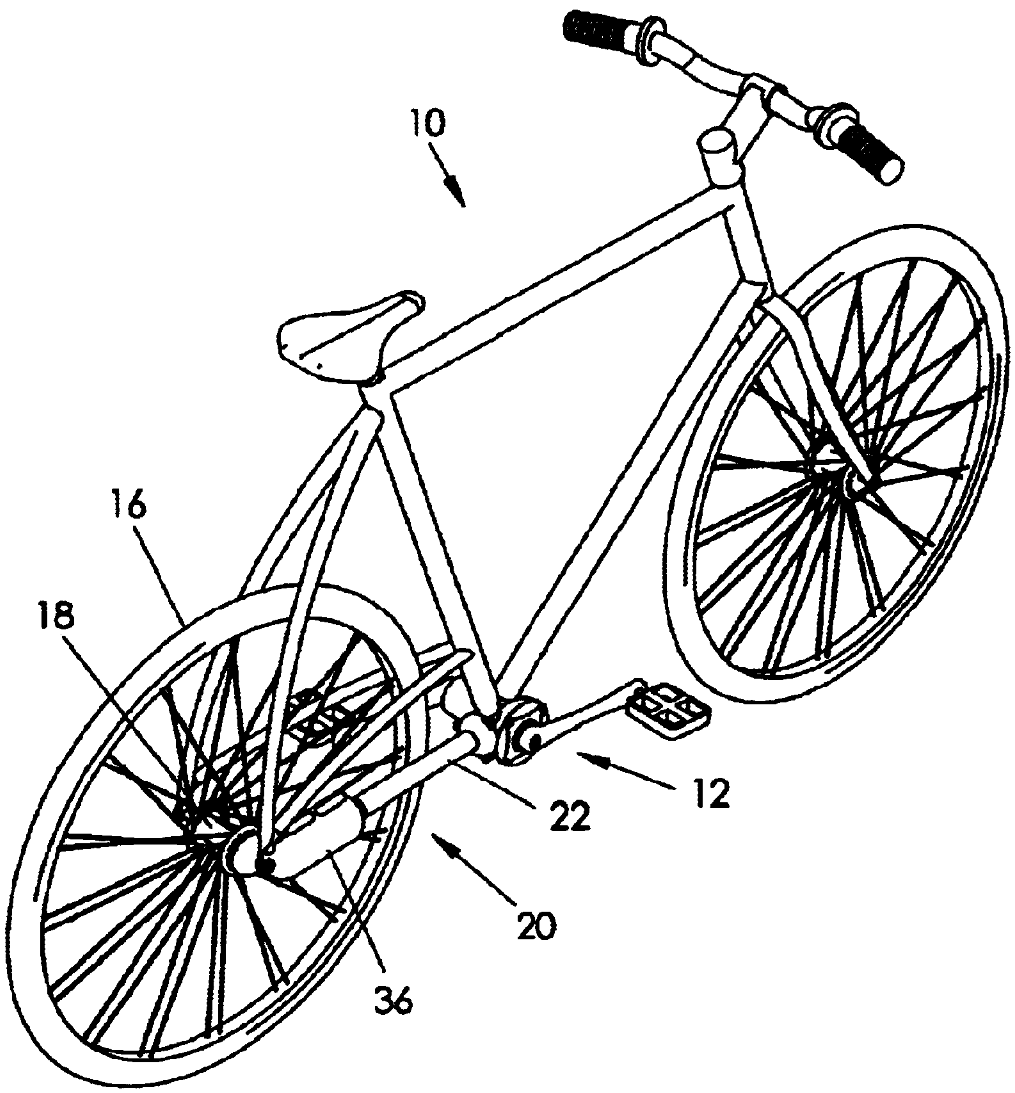
FIG. 1 is a perspective view of a multi-speed inline bicycle transmission according to the present invention mounted to a bicycle.
Figure 2:
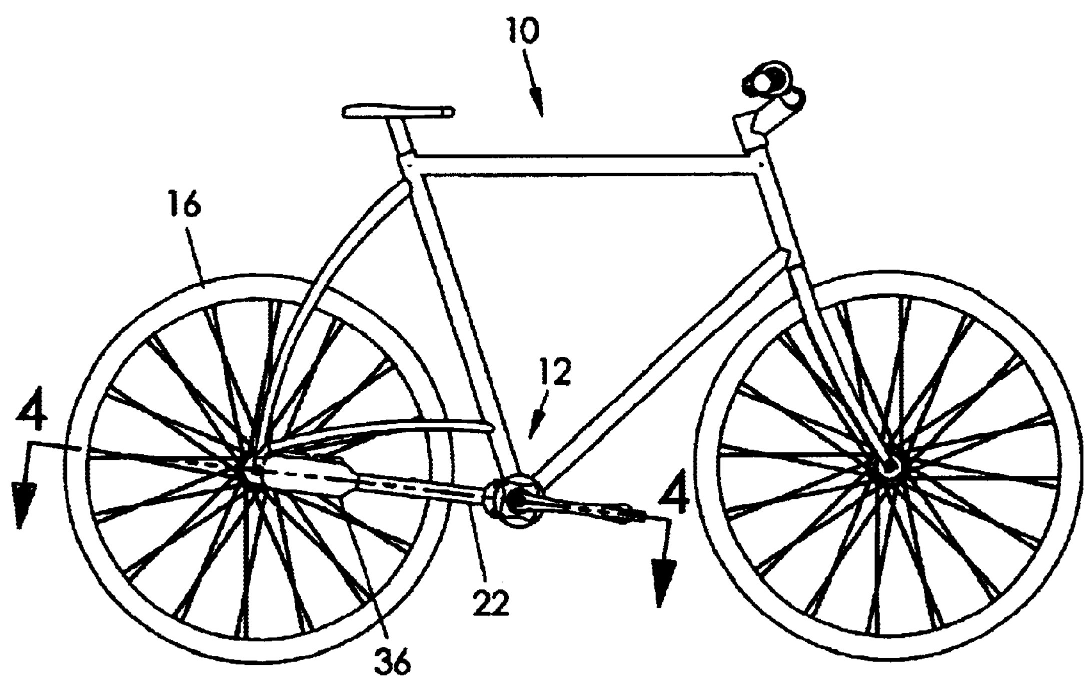
FIG. 2 is a side view of the transmission as in FIG. 1.

A multi-speed inline bicycle transmission 10 according to a preferred embodiment of the present invention will now be described in detail with reference to FIGS. 1 through 5 of the accompanying drawings. The transmission to be described is particularly suited for use with a bicycle having a frame 10 with a crank-and-pedal assembly 12 including a crank axle 14 coupled to a lower portion of the frame 10. In addition, the bicycle would include a rear wheel 16 and rear wheel axle 18 coupled to a rearward portion of the frame 10.

Figure 3B:
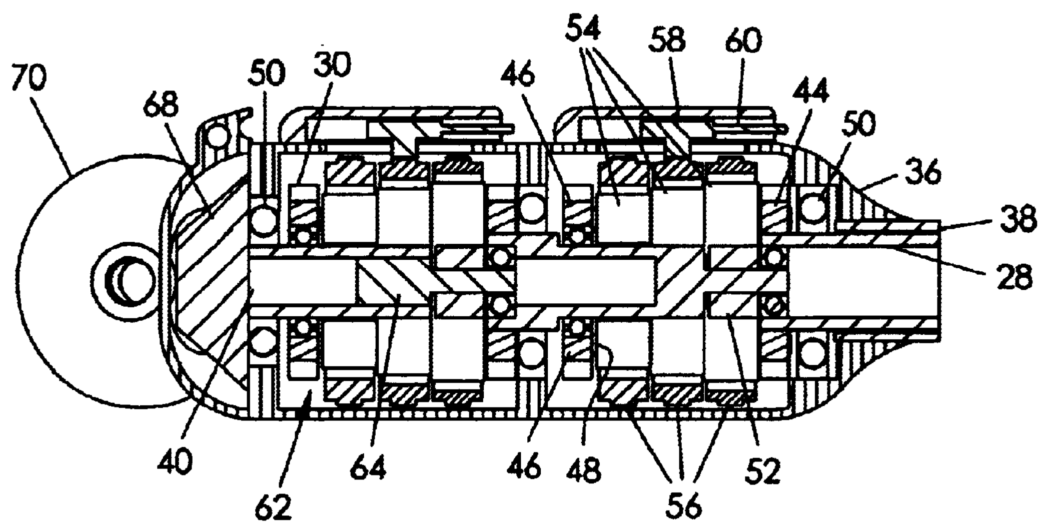
FIG. 3B is a sectional view of an epicyclic gear train taken along line 3B—3B of FIG. 3A.
Figure 4:
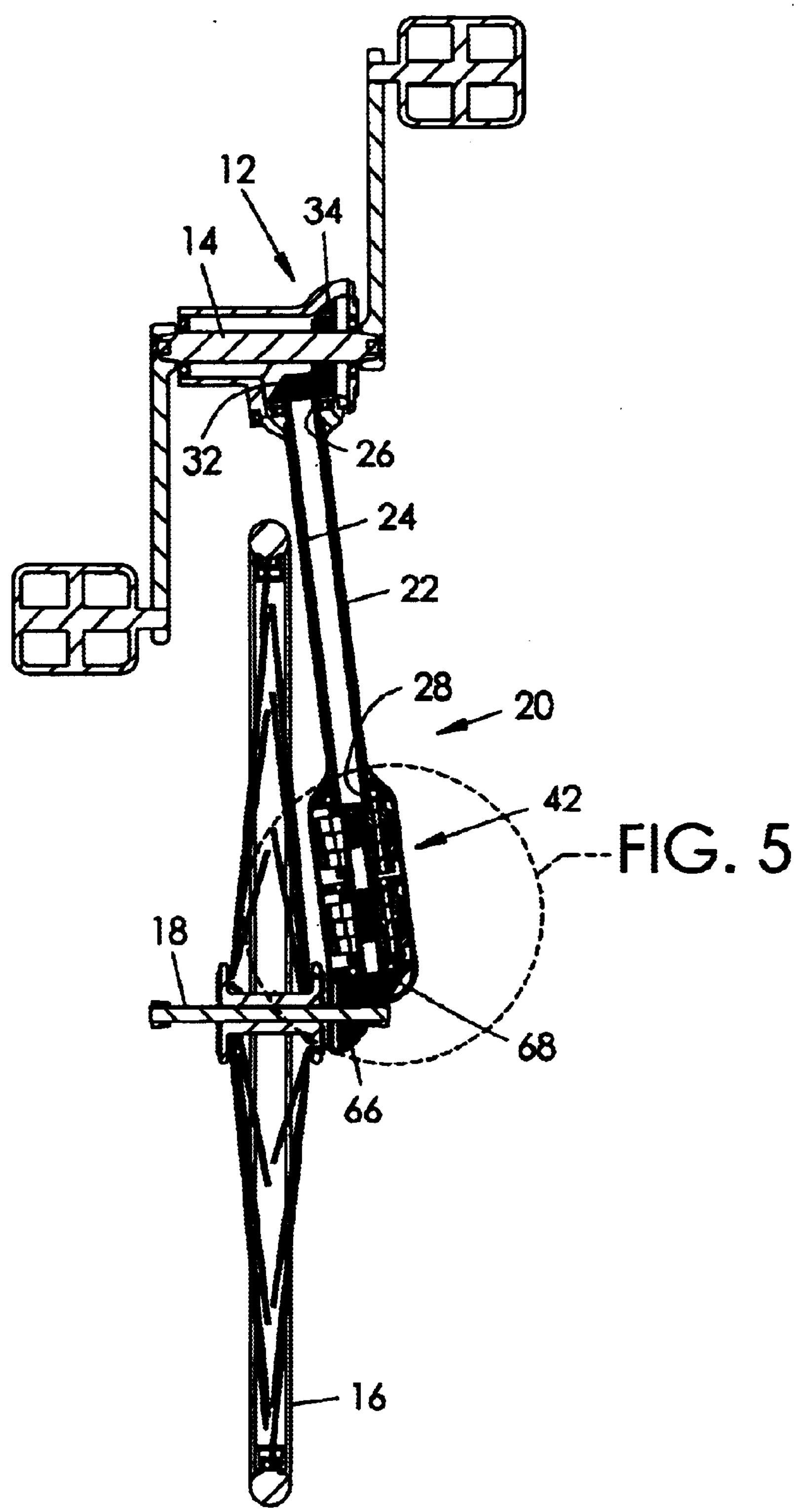
FIG. 4 is a sectional view of the bicycle transmission taken along line 4—4 of FIG. 2.

The bicycle transmission 10 according to this invention includes a drive shaft housing 22 and a gear box 36, each of which define an interior space for housing transmission components, as to be described in due course below. More particularly, the bicycle transmission 10 includes a drive shaft having input 24 and output 30 portions (FIG. 3B). The drive shaft input portion 24 is positioned in the drive shaft housing 22 and includes a first upstream end 26 and an opposed second downstream end 28. The first end 26 is coupled to the bicycle crank axle 14 with a first pair of bevel gears (FIG. 4). Specifically, the first pair of bevel gears includes a first input bevel gear 32 connected to the first end 26 of the drive shaft input portion 24 and a second input bevel gear 34 connected to the crank axle 14. The first 32 and second 34 input bevel gears are situated to mesh so as to transmit a rotating force from the crank axle 14 to the drive shaft input portion 24. In general, bevel gears present a beveled configuration so as to transmit power between angled shafts.

The gear box 36 defines an upstream opening 38 having a configuration for receiving the second end 28 of the drive shaft input portion 24 therein (FIG. 3B). The gear box 36 further defines a downstream opening 40 having a configuration for receiving an upstream end of the drive shaft output portion 30. Therefore, the input 24 and output 30 portions of the drive shaft are not fixedly connected to one another, but rather are coupled together via the gear train held within the gear box 36, as to be described more fully below.

Figure 3A:
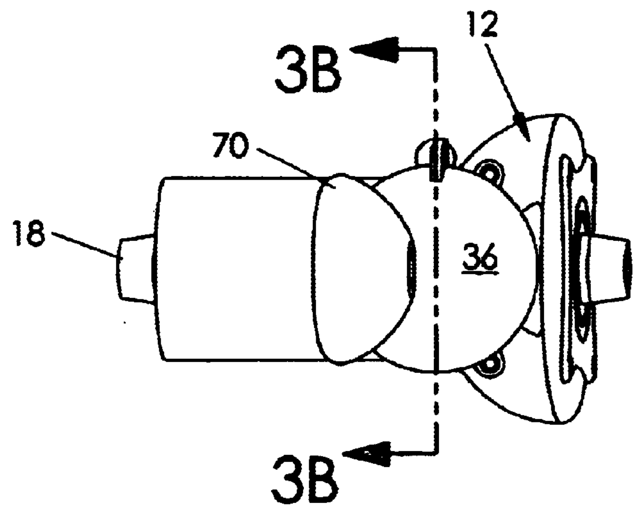
FIG. 3A is a fragmentary rear view on an enlarged scale of the bicycle transmission as in FIG. 2 removed from the bicycle.
Figure 5:
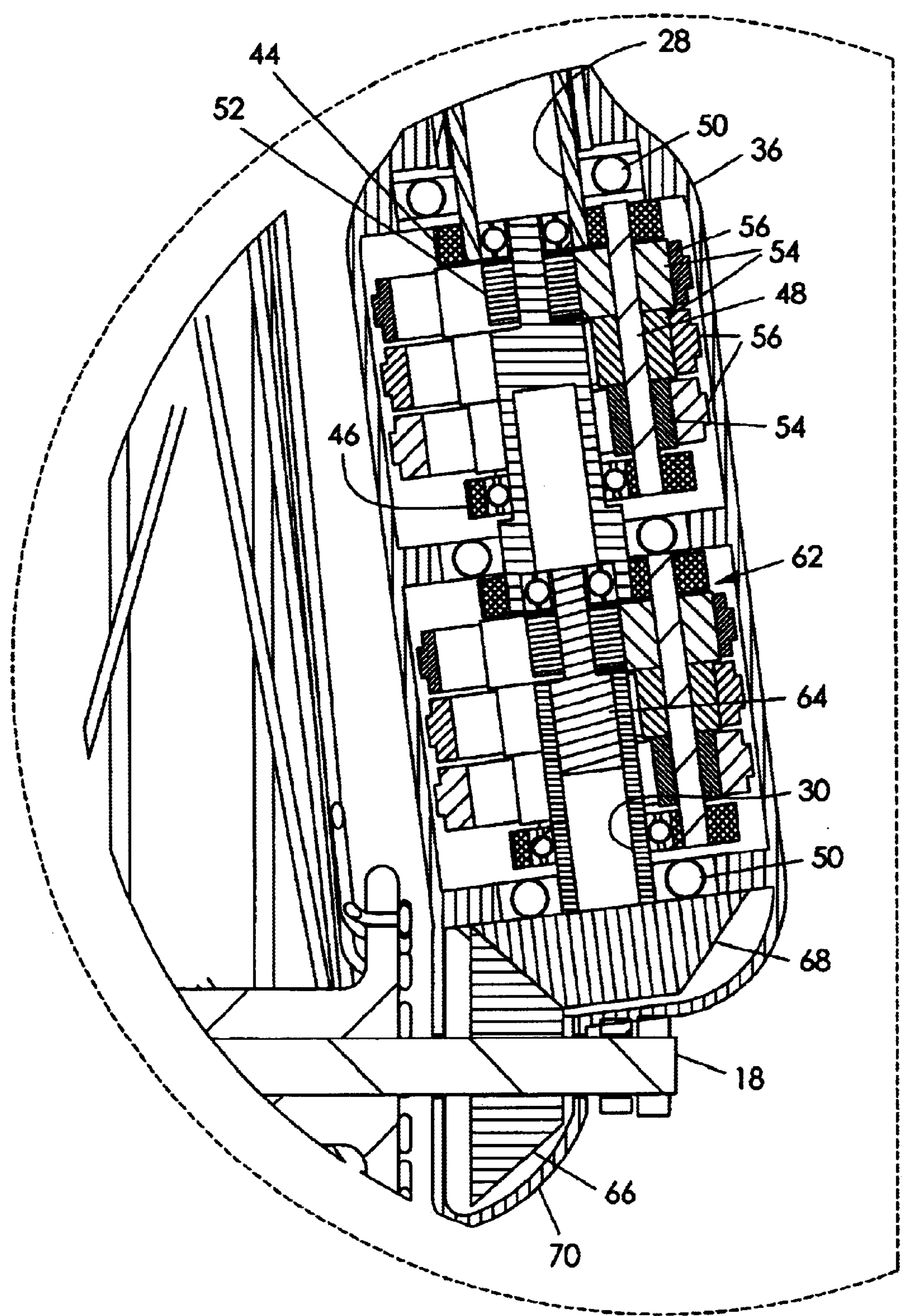
FIG. 5 is an isolated view on an enlarged scale taken from FIG. 4.

An epicyclic gear train 42 is positioned within the gear box 36 (FIGS. 3A and 5). The epicyclic gear train 42 is very compact and provides many gear ratio variations while using only a few compact gears. It enables input rotational power to be delivered to the rear wheel at a selected speed by distributing the input torque across selected gear configurations. More particularly, the epicyclic gear train 42 includes spaced apart upstream 44 and downstream 46 planet carrier plates fixedly coupled to one another with at least one carrier axle 48 although multiple spaced apart carrier axles are preferred for maintaining stability and alignment of the gear train. The upstream 44 and downstream 46 carrier plates are coupled to the drive shaft input 24 and output 30 portions within the gear box 36 with bearing couplings 50 such that the input and output portions may rotate at different speeds. A sun gear 52 is positioned between the carrier plates inline between the drive shaft input 24 and output 30 portions for independent rotation. The sun gear 52 is coupled to an end of the drive shaft output portion 30 for transmitting a rotational force thereto, as to be further described below. The sun gear 52 is also supported by bearings to allow speed differential.

A plurality of planet gears 54 are rotatably mounted to the carrier axle 48. The planet gears 54 on a particular carrier axle will be referred to as a "set" of planet gears, it being understood that an identical set of planet gears may be rotatably mounted to each carrier axle 48. The planet gears 54 of each set are fixedly attached to adjacent planet gears on a respective carrier axle 48 such that they all rotate in unison. At least one planet gear in each set of planet gears is positioned to mesh with the sun gear 52. Each planet gear 54 within a planet gear set includes a different diameter and number of teeth so as to provide a predetermined gear ratio.

The epicyclic gear train 42 includes a plurality of ring gears 56 positioned to mesh with corresponding planet gears 54 (FIGS. 3B and 5). Each ring gear 56 is free to rotate if not otherwise selectively halted. More particularly, a shift key 58 is situated adjacent the ring gears 56 and is connected to a shift cable 60 so that a user may move the shift key 58 into engagement with a desired ring gear 56. When a ring gear 56 is engaged by the shift key 58, that ring gear is halted and a corresponding transmission ratio is chosen. The relative sizes and positions of the selected ring gear relative to the other plan et gears determine the transmission ratio selected. Therefore, a rotational force of the drive shaft input portion 24 is transferred to the carrier plates and is then modified according to a selected transmission ratio. This modified rotation force is then imparted to the drive shaft output portion 30 via its connection to the sun gear 52. It can be seen, then, that the drive shaft output portion 30 may rotate at a speed different than that of the drive shaft input portion 24 according to a selected transmission ratio.

It should be understood that what has been described above is a first stage epicyclic gear train 42 and that a second stage epicyclic gear train 62 may also be included within the gear box 36 and coupled to the first epicyclic gear train 42 with an intermediate shaft 64. The second stage includes a construction substantially similar to a construction of the first stage. The addition of multiple stages provides more gear ratio options for the transmission. Ultimately, the drive shaft output portion 30 is fixedly attached to the final stage sun gear 52 for transmission of the rotational force as modified by the selected transmission ratios.

It should be appreciated that other shifting means (not shown) would also be suitable. Namely, electromagnetic clutches or servos could be used to halt selected ring gears 56 and thus set the desired transmission ratio.

The drive shaft output portion 30 is coupled to the bicycle rear wheel axle 18 with a second pair of bevel gears (FIG. 5). The second pair of bevel gears includes a first output bevel gear 66 connected to the rear wheel axle 18 and a second output bevel gear 68 connected to the drive shaft output portion 30. Of course, the first output bevel gear 66 may be enclosed with a bevel gear housing 70 (FIGS. 3A and 3B). The second output bevel gear 68 is positioned to mesh with the first output bevel gear 66 and allows efficient transmission of power between the respective shafts that are angled relative to one another.

In use, the multi-speed inline transmission 10 may be mounted to a bicycle frame 10 such that the drive shaft input portion 24 is engaged with the crank axle 14 of the crankand-and-pedal assembly 12 and such that the drive shaft output portion 30 is engaged with the rear wheel axle 18. A user may then pedal the bicycle to impart a rotating force to the drive shaft input portion 24. The rotation of the drive shaft input portion 24 is transferred inline to the multi-stage epicyclic gear train 42 where a transmission ratio may be selected by the cyclist. The inline position of the epicyclic gear train 42 along with its compact and straight cut gear construction provides optimal power transfer efficiency with minimal power loss. The straight cut gearing is also more reliable than gearing that requires clutches or similar gear selection mechanisms. The rotational force modified according to a selected transmission ratio is imparted to the rear wheel axle 18 using another efficient bevel gear combination.

It is understood that the bicycle transmission 10 described herein could be enhanced to include a central processing unit (not shown) and display to provide data and feedback on such things as bicycle velocity, crank axle RPM, bicycle incline, power input, or other user preferences.

It is understood that while certain foreseeable forms of this invention have been illustrated and described, it is not limited thereto except insofar as such limitations are included in the following claims and foreseeable functional equivalents thereof.

Having thus described the invention, what is claimed as new and desired to be secured by Letters Patent is as follows:

1. A multi-speed transmission for a bicycle having a frame, a crank-and-pedal assembly including a crank axle coupled to a lower portion of the frame, and a rear wheel including a rear axle coupled to a rearward portion of the frame, said transmission comprising:

a drive shaft having collinear input and output portions, said drive shaft input portion having opposed first and second ends;

a first pair of bevel gears coupled between said crank axle and said first end of said drive shaft input portion;

a gear box mounted inline to said drive shaft intermediate said drive shaft input and output portions, said gear box defining an upstream opening for receiving said second end of said drive shaft input portion and defining a downstream opening for receiving said drive shaft output portion;

primary epicyclic gear means situated in said gear box for transmitting a rotating force of said drive shaft input portion to said drive shaft output portion according to a selected transmission ratio; and a second pair of bevel gears coupled between said drive shaft output portion and said rear axle.

2. The bicycle transmission as in claim 1 wherein said primary epicyclic gear means includes:

first and second spaced apart planet carrier plates fixedly interconnected to one another with a carrier axle and mounted on bearings to said drive shaft input and output portions, respectively;

a sun gear fixedly attached to said drive shaft output portion;

a plurality of planet gears rotatably mounted to said carrier axle, said plurality of planet gears being fixedly attached to one another and situated in meshing engagement with said sun gear;

a plurality of ring gears positioned to mesh with corresponding planet gears for relative rotation thereabout; and shifting means for selectably halting rotation of a selected ring gear, whereby to select a predetermined gear ratio by which to transfer said rotational force of said drive shaft input portion to said drive shaft output portion.

3. The bicycle transmission as in claim 1 wherein said first pair of bevel gears includes:

a first input bevel gear connected to said first end of said drive shaft input portion; and a second input bevel gear connected to said crank axle and positioned for engagement with said first input bevel gear for transmitting a rotating force of said crank axle to said drive shaft input portion.

4. The bicycle transmission as in claim 3 wherein said second pair of bevel gears includes:

a first output bevel gear connected to said rear axle; and a second output bevel gear connected to said drive shaft output portion and positioned for engagement with said first output bevel gear for transmitting a rotating force of said drive shaft output portion to said rear axle.

5. The bicycle transmission as in claim 1 wherein each of said plurality of planet gears includes a diameter different from a diameter of an adjacent planet gear.

6. The bicycle transmission as in claim 1 further comprising secondary epicyclic gear means situated in said gearbox and coupled to said primary epicyclic gear means for further modifying said transmission ratio of said rotating force of said drive shaft input portion.

7. The bicycle transmission as in claim 1 further comprising a drive shaft housing extending between said gear box and said bicycle crank assembly, said drive shaft input portion being situated in said drive shaft housing.

8. A multi-speed transmission for a bicycle having a frame, a crank-and-pedal assembly including a crank axle coupled to a lower portion of the frame, and a rear wheel including a rear axle coupled to a rearward portion of the frame, said transmission comprising:

a drive shaft having collinear input and output portions, said drive shaft input portion having opposed first and second ends;

a first pair of bevel gears coupled between said crank axle and said first end of said drive shaft input portion for transmitting a rotational force from said crank axle to said drive shaft input portion;

an epicyclic gear train mounted inline to said drive shaft intermediate said drive shaft input and output portions, said epicyclic gear train including:

first and second spaced apart planet carrier plates fixedly interconnected to one another with a carrier axle and mounted on bearings to said drive shaft input and output portions, respectively; a sun gear fixedly attached to said drive shaft output portion;

a first plurality of planet gears rotatably mounted to said carrier axle, said first plurality of planet gears being adjacent and fixedly attached to one another and situated for meshing engagement with said sun gear;

a plurality of ring gears positioned to mesh with corresponding planet gears for relative rotation thereabout; and shifting means for selectably halting rotation of a selected ring gear, whereby to select a predetermined gear ratio by which to transfer a rotational force of said drive shaft input portion to said drive shaft output portion;

a second pair of bevel gears coupled between said drive shaft output portion and said rear axle.

9. The bicycle transmission as in claim 8 further comprising a gear box mounted to said drive shaft intermediate said drive shaft input and output portions and defining an interior space, said epicyclic gear train being positioned within said interior space of said gear box.

10. The bicycle transmission as in claim 9 further comprising a drive shaft housing extending between said gear box and said bicycle crank assembly, said drive shaft input portion being situated in said drive shaft housing.

11. The bicycle transmission as in claim 8 wherein said first pair of bevel gears includes:

a first input bevel gear connected to said first end of said drive shaft input portion; and a second input bevel gear connected to said crank axle and positioned for engagement with said first input bevel gear for transmitting a rotating force of said crank axle to said drive shaft input portion.

12. The bicycle transmission as in claim 8 wherein said second pair of bevel gears includes:

a first output bevel gear connected to said rear axle; and a second output bevel gear connected to said drive shaft output portion and positioned for engagement with said first output bevel gear for transmitting a rotating force of said drive shaft output portion to said rear axle.

13. The bicycle transmission as in claim 8 wherein each of said first plurality of planet gears includes a diameter different from a diameter of a laterally adjacent planet gear.

14. The bicycle transmission as in claim 8 further comprising a secondary epicyclic gear train connected to said epicyclic gear train for modifying a transmission ratio of said rotational force of said drive shaft input portion.

* * * * *